US010611560B1

(12) United States Patent
Patak

(10) Patent No.: US 10,611,560 B1
(45) Date of Patent: Apr. 7, 2020

(54) ROLL-OFF TUB STYLE CONTAINER WITH IMPROVED ROLL-OFF WHEEL ASSEMBLIES

(71) Applicant: Michael T. Patak, Elkhorn, NE (US)

(72) Inventor: Michael T. Patak, Elkhorn, NE (US)

( * ) Notice: Subject to any disclaimer, the term of this patent is extended or adjusted under 35 U.S.C. 154(b) by 0 days.

(21) Appl. No.: 16/260,786

(22) Filed: Jan. 29, 2019

(51) Int. Cl.
*B65D 90/18* (2006.01)
*B65D 88/12* (2006.01)
*B65F 1/14* (2006.01)

(52) U.S. Cl.
CPC ........... *B65D 90/18* (2013.01); *B65D 88/123* (2013.01); *B65F 1/1473* (2013.01)

(58) Field of Classification Search
CPC ...................................................... B65D 90/18
See application file for complete search history.

(56) References Cited

U.S. PATENT DOCUMENTS

| | | | |
|---|---|---|---|
| 5,012,575 A * | 5/1991 | Heideman ............... | B60B 35/04 280/79.11 |
| 9,586,440 B2 * | 3/2017 | Taylor ................... | B60B 15/266 |
| 10,336,135 B1 * | 7/2019 | Engelbrecht ............ | B60B 33/06 |
| 2008/0110905 A1 * | 5/2008 | Cowie .................... | B65D 90/16 220/636 |
| 2010/0012667 A1 * | 1/2010 | Powell ................. | B65D 88/123 220/628 |

OTHER PUBLICATIONS

Shuyler roll off wheel, http://www.goschuyler.com/products/wheels/. (Year: 2016).*

Duraflex casters catalog page, http://www.containercomponents.com/brochure.pdf. (Year: 2018).*

Green city waste solutions rubber roll off wheel video from https://www.youtube.com/watch?v=htJmP4D43g8. (Year: 2014).*

Bondrelene wheels, http://www.bondcaster.com/wheels6.html, 2015 (Year: 2015).*

UHMW PE Wheels, http://www.pioneercastors.net/UHMW-PE-wheels.php, 2016 (Year: 2016).*

* cited by examiner

*Primary Examiner* — Mark C Hageman
(74) *Attorney, Agent, or Firm* — Dennis L. Thomte; Thomte Patent Law Office LLC

(57) ABSTRACT

A roll-off tub style container for transporting materials with the container including first and second roll-off roller assemblies secured to the rearward end of the container. In one embodiment, the conventional steel rollers of the roll-off roller assemblies are replaced with plastic rollers. In a second embodiment, rubber tires are mounted on the steel rollers. In a third embodiment, plastic slide members are secured to the underside of the frame members of the container at the forward ends of the frame members. The three embodiments are designed to prevent damage to a driveway or the like during the on-loaded of the container onto a truck and during the unloading of the container from the truck.

2 Claims, 7 Drawing Sheets

10 19 38' 40' 46' 36' 42' 48' 44' 34' 24 22 38 46 44 16 36 42 48 34 40

19
34
26
16
10
22
30
28

38'
52'
50'
36'
32
19
30
10
38
52
50
56
36

ROLL-OFF TUB STYLE CONTAINER WITH IMPROVED ROLL-OFF WHEEL ASSEMBLIES

BACKGROUND OF THE INVENTION

Field of the Invention

This invention relates to a roll-off tub style container and more particularly to a roll-off tub style container which includes a pair of improved roll-off roller assemblies at the rearward end thereof which will prevent damage to the driveway or other surface upon which the container is positioned during the loading of the container onto a truck and the unloading of the container from the truck. Further, this invention also relates to plastic protective slide members which are mounted on the underside of the forward ends of the frame members of the container so that they will prevent damage to the driveway or other surface upon which the container is positioned during the loading of the container onto the truck and the unloading of the container from the truck.

Description of the Related Art

Many types of containers have been previously provided for transporting materials. Common types of containers are the roll-off tub style containers. The containers normally have a pair of steel roll-off rollers at the rearward end thereof which come into play during the loading of the container onto a truck and the unloading of the container from a truck. The steel rollers may, and usually do, cause damage to a driveway or other surface upon which the container is located during the loading of the container onto the truck and the unloading of the container from the truck.

Further, the prior art roll-off containers of the prior art have a pair of longitudinally extending frame members at the underside thereof. The forward ends thereof engage the driveway or other surface during the loading of the container onto the truck and the unloading of the container from the truck thereby damaging the driveway or other surface.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A roll-off tub style container is disclosed with the container including a floor having a forward end, a rearward end, a first side and a second side. The floor is supported on first and second longitudinally extending frame members having a forward end, a rearward end, an upper side and a lower side. The container includes a front wall, a first side wall, a second side wall and a rear gate.

First and second roll-off roller assemblies are secured to the container at the rearward end thereof. The original roll-off roller assemblies include steel cylindrical rollers. In one embodiment of the instant invention, the steel rollers are replaced by plastic rollers. In a second embodiment, rubber tires are mounted on the steel rollers. In a third embodiment, protective plastic slide members are secured to the lower side of the first and second frame members at the forward ends thereof.

The above embodiments prevent damage to a driveway or the like during the on-loading of the container onto a truck and during the off-loading of the container from the truck.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
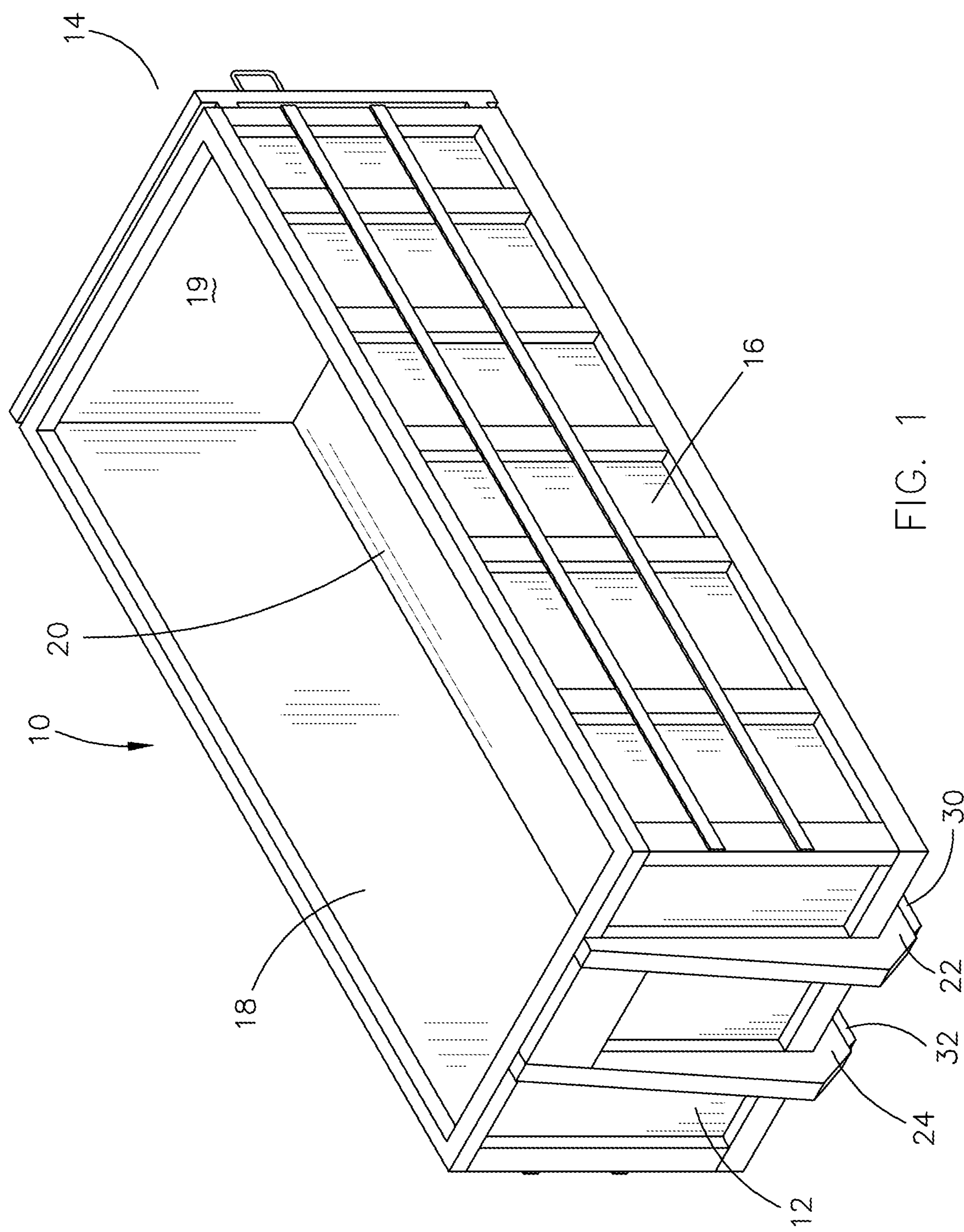
FIG. 1 is a front perspective view of the roll-off container of this invention.
Figure 2:
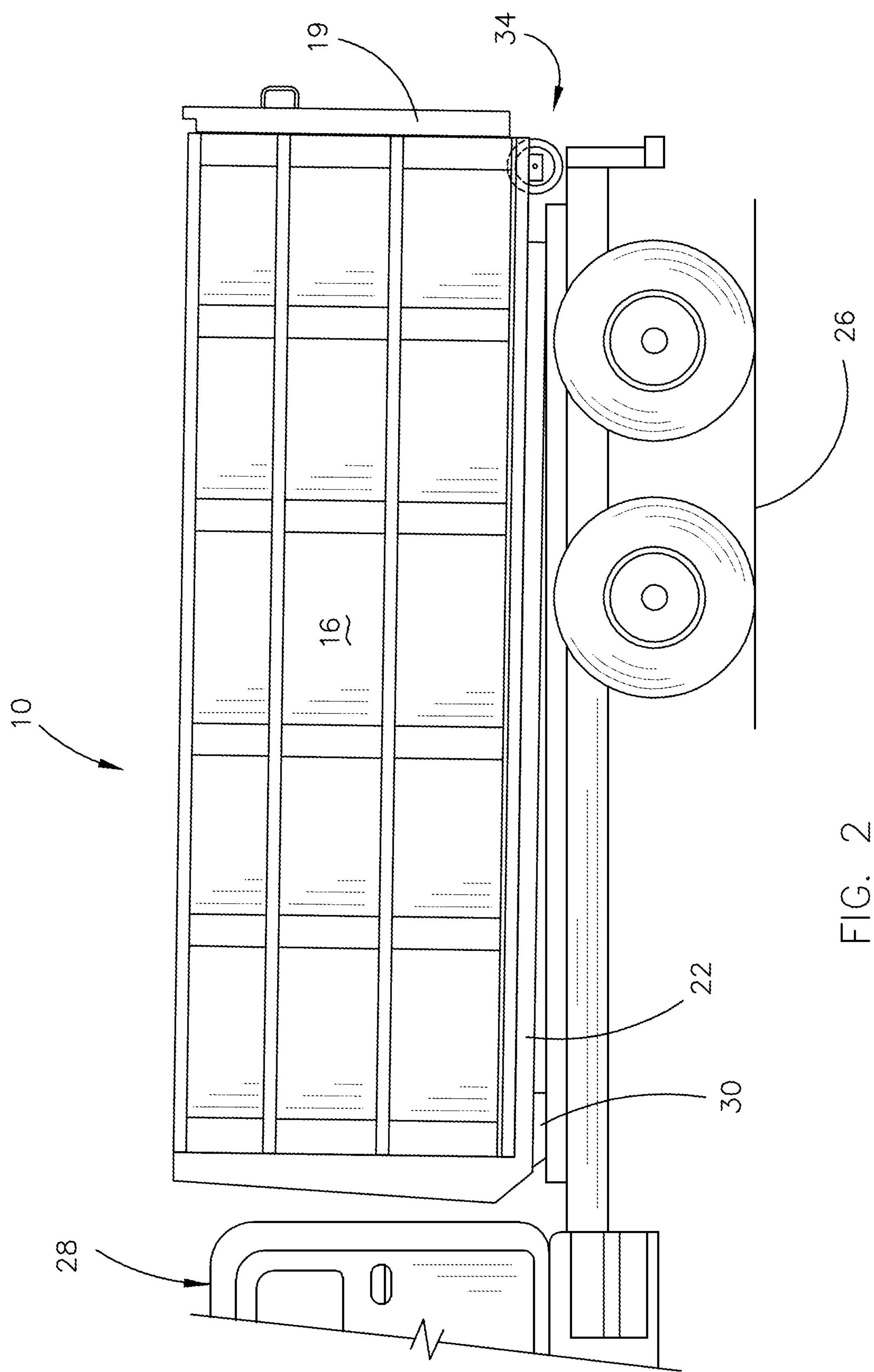
FIG. 2 is a partial side view illustrating the container of this invention mounted on a truck.
Figure 3:
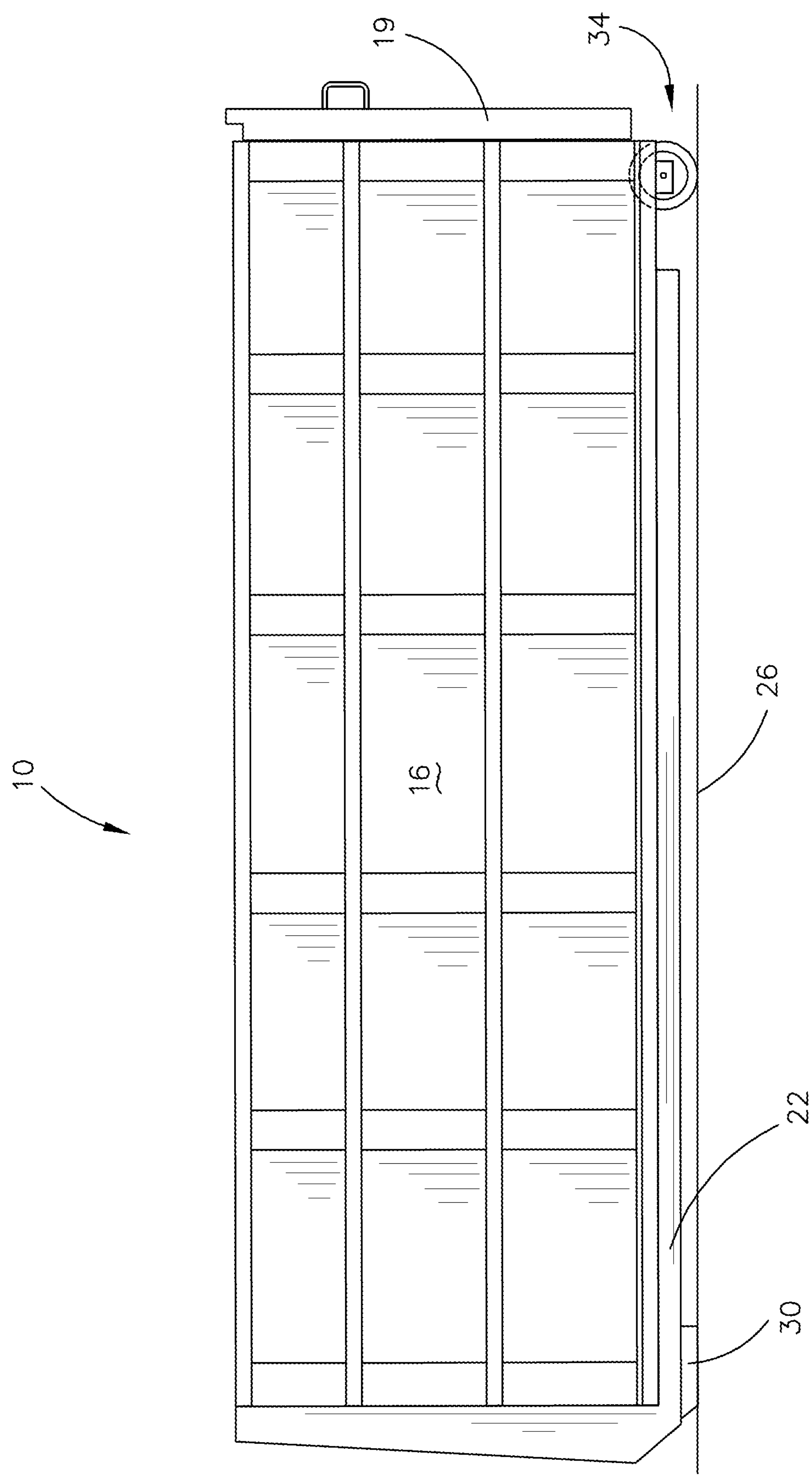
FIG. 3 is a side view of the container of this invention which is positioned on a driveway or other surface.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the roll-off tub style container of this invention. Container 10 includes a forward end 12, a rearward end 14, a first side 16, a second side 18 and a tail gate 19. Container 10 includes a generally horizontally disposed floor 20 which is supported on longitudinally extending frame members 22 and 24 in conventional fashion. The container 10 is designed to be positioned on a driveway 26 or some other surface while it is being filled with material. Container 10 is designed to be positioned on a truck 28 for transport to a dumping location.

Plastic slide members 30 and 32 are secured to the underside of the forward ends of frame members 22 and 24 respectively. Slide members 30 and 32 may be secured to frame members 22 and 24 by an adhesive or some other means. The slide members 30 and 32 are preferably comprised of ultra high molecular weight polyethylene (UHMW).

Figure 4:
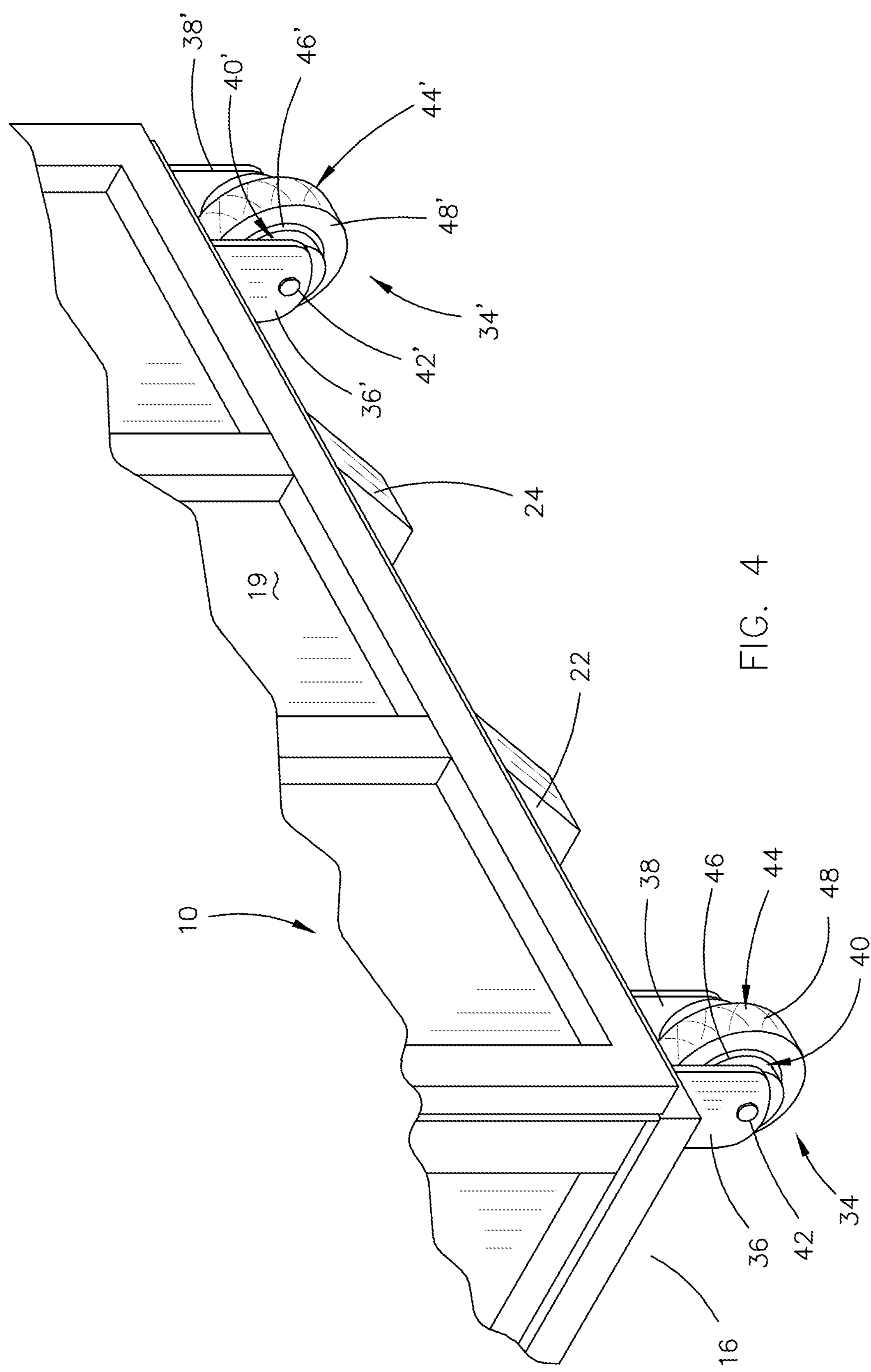
FIG. 4 is a partial rear perspective view of the container of this invention which illustrates one embodiment of the roll-off roller assemblies at the rear of the container.
Figure 6:
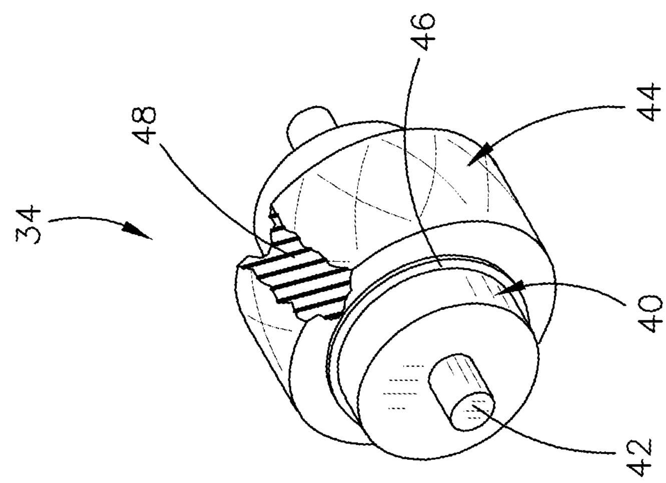
FIG. 6 is a perspective view of the roll-off roller assembly of FIG. 4 with a portion thereof cut-away to illustrate the invention.
Figure 5:
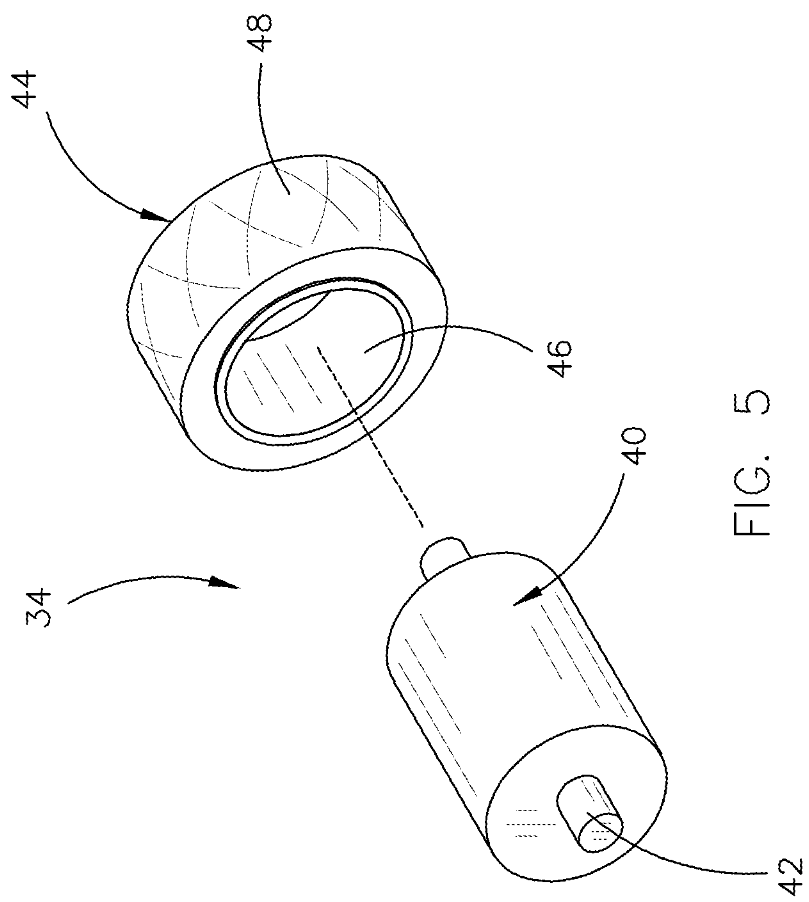
FIG. 5 is an exploded perspective view of one of the roll-off roller assemblies of FIG. 4.

Roll-off roller assemblies 34 and 34' are secured to the rearward end of container in a horizontally spaced-apart manner as seen in FIG. 4. Inasmuch as roll-off roller assemblies 34 and 34' are identical, only roll-off roller assembly 34 will be described in detail with " " indicating identical structure on roll-off roller assembly 34'.

Roll-off roller assembly 34 includes conventional brackets 36 and 38 which extend downwardly from container 10 at the rearward end thereof at the first side thereof. The original steel roller 40 includes a shaft 42 which is rotatably mounted in brackets 36 and 38. It is this original steel roller 40 which is originally installed on the container and which may cause scraping damage to the driveway 26 or other surface during the loading of the container 10 onto the truck 28 or the unloading of the container 10 from the truck 28.

The original roller 40 is modified by installing a wheel 44 onto the roller 40. Wheel 44 includes a cylindrical metal rim 46 having a solid rubber tire 48 mounted thereon. The solid rubber tire 48 could be replaced by a plastic tire if so desired. The rim 46 with the rubber tire 48 mounted thereon is slipped onto the roller 40. The ends of the rim 46 are then welded to the roller 40 so that wheel 44 is centrally positioned on roller 40.

Figure 7:
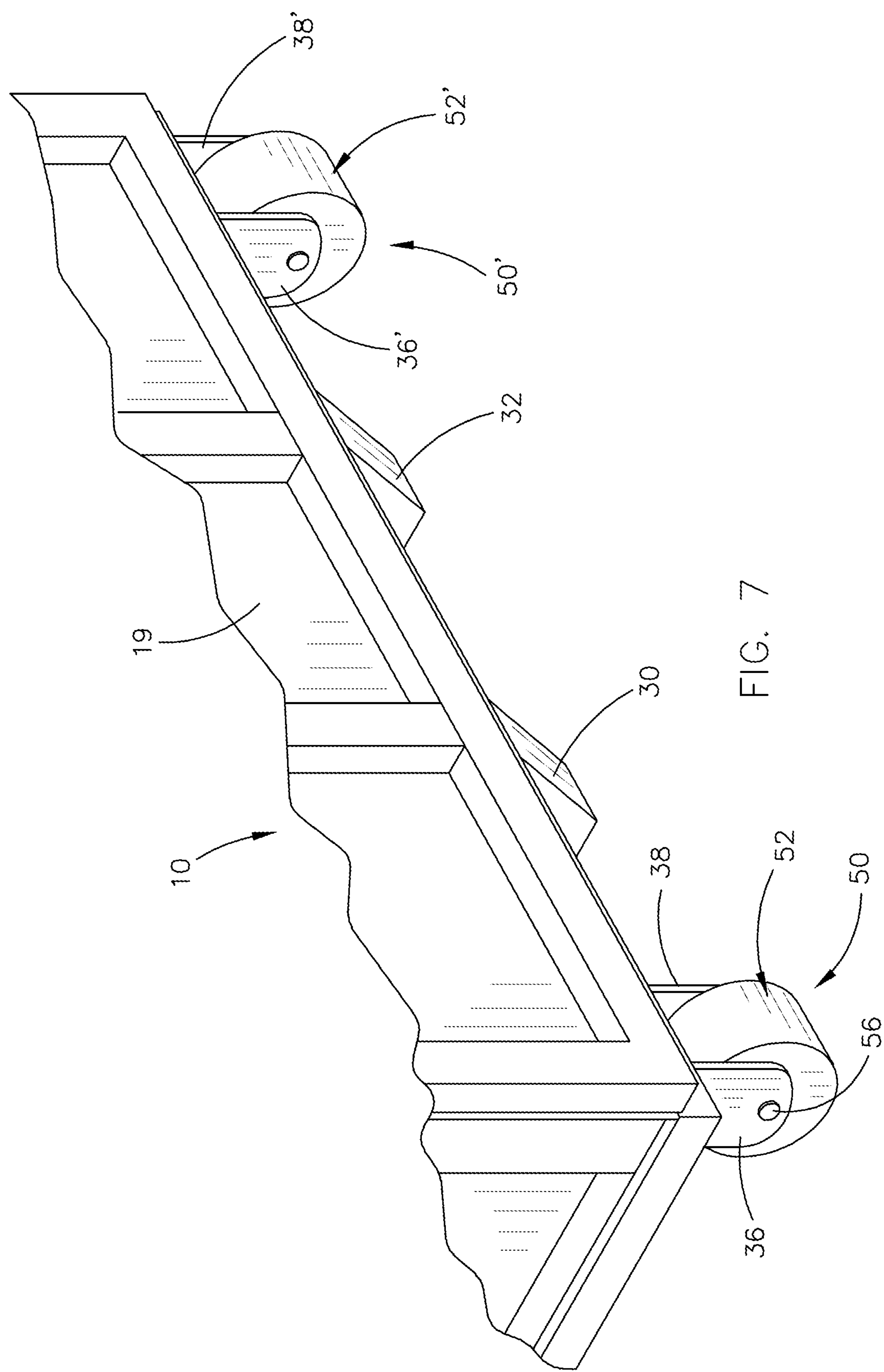
FIG. 7 is a partial rear perspective view of a second embodiment of the roll-off roller assemblies of this invention.
Figure 8:
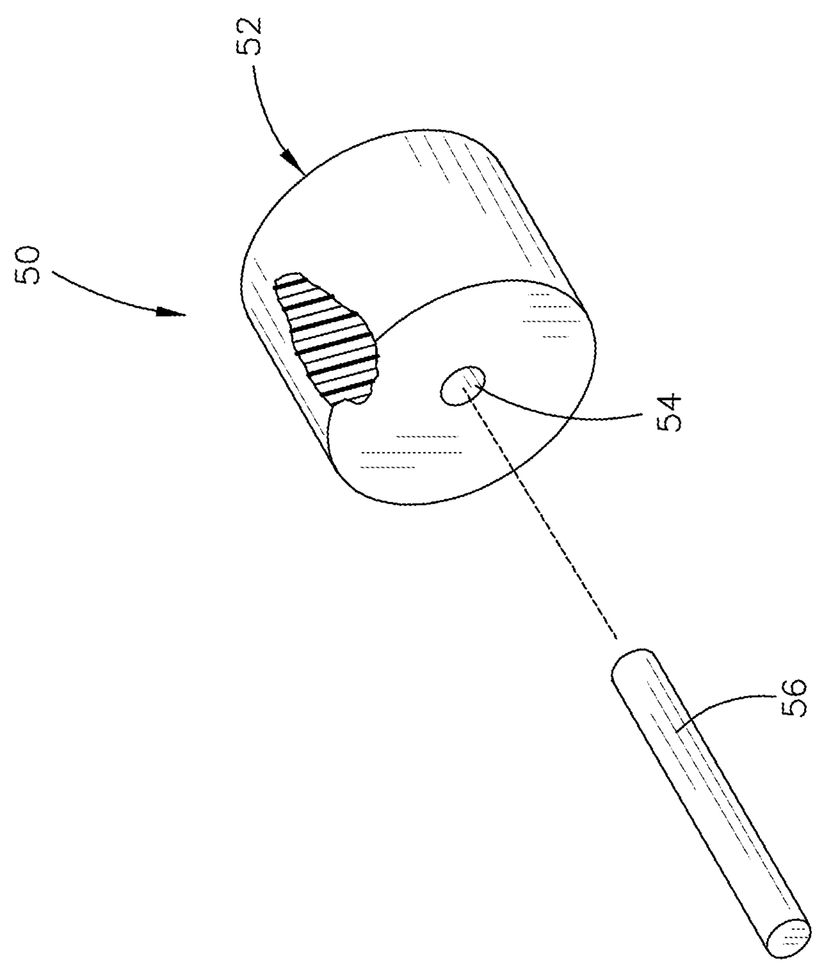
FIG. 8 is an exploded perspective view of the roll-off roller assembly of FIG. 7 with a portion thereof cut-away to more fully illustrate the invention.

FIGS. 7 and 8 illustrate a second embodiment of the roll-off roller assemblies which are designated by the reference numerals 50 and 50'. Inasmuch as roll-off assembly 50' is identical to roll-off roller assembly 50, only roll-off roller assembly 50 will be described in detail with "'" designating identical structure on roll-off roller assembly 50'. In the embodiment of FIGS. 7 and 8, the original brackets 36 and 38 are utilized but the original roller 40 is not used. A cylindrical roller or wheel 52 replaces roller 40 and is comprised of a plastic material such as UHMW. Roller 52 has a central bore 54 formed therein which receives a metal shaft 56 therein, the ends of which are secured to the brackets 36 and 38 whereby roller 52 is rotatably mounted on shaft 56.

The rubber tires 48 and 48' on roll-off roller assemblies 34 and 34' prevent damage to the driveway 26 or other surface during the loading of the container 10 onto the truck 28 and during the unloading of the container 10 from truck 28. The plastic rollers 52 and 52' likewise prevent damage to the driveway 26 or other surface. Further, the plastic slide members 30 and 32 at the underside of the forward ends of the frame members 22 and 24 prevent damage to the driveway 26 or other surface during the loading and off-loading of the container 10.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:

a roll-off container for transporting material;

said roll-off container having a forward end, a rearward end, a first side and a second side;

said roll-off container including original first and second spaced-apart brackets which extend downwardly therefrom at said rearward end thereof at said first side thereof;

said roll-off container including an elongated original first metal shaft which extends between said original first and second spaced-apart brackets;

said roll-off container including a horizontally disposed and elongated cylindrical original first steel roller mounted on said original first metal shaft whereby said original first steel roller is rotatably mounted between said original first and second spaced-apart brackets;

said original first steel roller having first and second ends;

a first cylindrical metal rim embracing said original first steel roller;

said first cylindrical metal rim having first and second ends;

said first end of said first cylindrical metal rim being spaced inwardly of said first end of said original first steel roller;

said second end of said first cylindrical metal rim being spaced inwardly of said second end of said original first steel roller;

said first and second ends of said first cylindrical metal rim being welded to said original first steel roller;

a first plastic tire mounted on said first cylindrical metal rim;

said roll-off container including original third and fourth spaced-apart brackets which extend downwardly therefrom at said rearward end thereof at said second side thereof;

said roll-off container including an elongated original second metal shaft which extends between said original third and fourth spaced-apart brackets;

said roll-off container including a horizontally disposed and elongated cylindrical original second steel roller mounted on said original second metal shaft whereby said original second steel roller is rotatably mounted between said original third and fourth brackets;

said original second steel roller having first and second ends;

a second cylindrical metal rim embracing said original second steel roller;

said second cylindrical metal rim having first and second ends;

said first end of said second cylindrical metal rim being spaced inwardly of said first end of said original second steel roller;

said second end of said second cylindrical metal rim being spaced inwardly of said second end of said original second steel roller;

said first and second ends of said second cylindrical metal rim being welded to said original second steel roller; and a second plastic tire mounted on said second cylindrical metal rim.

2. In combination:

a roll-off container for transporting material;

said roll-off container having a forward end, a rearward end, a first side and a second side;

said roll-off container including original first and second spaced-apart brackets which extend downwardly therefrom at said rearward end thereof at said first side thereof;

a horizontally disposed first elongated and cylindrical metal shaft extending between said original first and second spaced-apart brackets;

a horizontally disposed cylindrical first plastic roller;

said cylindrical first plastic roller having a central bore formed therein;

said first cylindrical metal shaft extending through said central bore of said cylindrical first plastic roller;

said first plastic roller being rotatably mounted directly on said first cylindrical metal shaft between said original first and second spaced-apart brackets;

said roll-off container including original third and fourth spaced-apart brackets which extend downwardly therefrom at said rearward end thereof at said second side thereof;

a horizontally disposed elongated and cylindrical second metal shaft extending between said original third and fourth spaced-apart brackets;

a horizontally disposed and cylindrical second plastic roller;

said cylindrical second plastic roller having a central bore formed therein;

said second cylindrical metal shaft extending through said central bore of said cylindrical second plastic roller;

said second plastic roller being rotatably mounted directly on said second cylindrical metal shaft between said original third and fourth spaced-apart brackets; and said horizontally disposed first plastic roller and said horizontally disposed second plastic roller being comprised of an ultra-high molecular weight polyethylene material.

* * * * *